US011364437B2

(12) United States Patent
Trombetta et al.

(10) Patent No.: US 11,364,437 B2
(45) Date of Patent: Jun. 21, 2022

(54) ESTABLISHING AND MANAGING MULTIPLAYER SESSIONS

(71) Applicants: SONY INTERACTIVE ENTERTAINMENT LLC, San Mateo, CA (US); SONY INTERACTIVE ENTERTAINMENT INC., Tokyo (JP)

(72) Inventors: Steven Trombetta, San Mateo, CA (US); Shogo Suzuki, Tokyo (JP); Masanao Nishikido, Tokyo (JP); Benedikt Neuenfeldt, Tokyo (JP)

(73) Assignees: SONY INTERACTIVE ENTERTAINMENT LLC, San Mateo, CA (US); SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/917,465

(22) Filed: Jun. 30, 2020

(65) Prior Publication Data

US 2020/0330863 A1 Oct. 22, 2020

Related U.S. Application Data

(63) Continuation of application No. 16/146,645, filed on Sep. 28, 2018, now Pat. No. 10,695,671.

(51) Int. Cl.
*A63F 13/45* (2014.01)
*A63F 13/34* (2014.01)
(Continued)

(52) U.S. Cl.
CPC .............. *A63F 13/34* (2014.09); *A63F 13/48* (2014.09); *A63F 13/795* (2014.09); *A63F 13/87* (2014.09)

(58) Field of Classification Search
CPC ........ A63F 13/10; A63F 13/216; A63F 13/30; A63F 13/32; A63F 13/327; A63F 13/33;
(Continued)

(56) References Cited

U.S. PATENT DOCUMENTS 5,630,757 A 5/1997 Gagin et al.
5,634,129 A 5/1997 Dickinson
(Continued)

FOREIGN PATENT DOCUMENTS

CN 104069637 A 10/2014
EP 1125617 8/2001
(Continued)

OTHER PUBLICATIONS

U.S. Appl. No. 17/241,829, Steven Trombetta, Dynamic Interfaces for Launching Direct Gameplay, filed Apr. 27, 2021.
(Continued)

*Primary Examiner* — Omkar A Deodhar
(74) *Attorney, Agent, or Firm* — Polsinelli LLP (57) ABSTRACT

A system and method for establishing and managing multiuser sessions is provided. A plurality of interactive content titles and at least one activity template associated with each of the interactive content titles are stored in memory. A processor executes instructions stored in memory, wherein execution of the instructions by the processor receives input regarding a selected activity associated with one of the interactive content titles stored in memory, retrieves an activity template associated with the selected activity from memory, establishes a session based at least on the activity properties, assigns a user as a leader of the established session, adds each of a plurality of peers to an available participant slot in accordance with leader input, and automatically initiates the selected activity within the established session.

18 Claims, 4 Drawing Sheets

(51) Int. Cl.
*A63F 13/87* (2014.01)
*A63F 13/48* (2014.01)
*A63F 13/795* (2014.01)

(58) Field of Classification Search
CPC ...... A63F 13/332; A63F 13/335; A63F 13/45;
A63F 13/48; A63F 13/533; A63F 13/70;
A63F 13/79; A63F 13/795; A63F 13/86;
A63F 13/87; A63F 2300/55; A63F
2300/5546; A63F 2300/556; A63F
2300/5566; A63F 2300/558; A63F
2300/572; A63F 2300/577; G06Q 50/01;
G06Q 20/384
See application file for complete search history.

(56) References Cited

U.S. PATENT DOCUMENTS

| | | |
|---|---|---|
| 5,682,139 A | 10/1997 | Pradeep |
| 5,704,032 A | 11/1997 | Badovinatz et al. |
| 5,823,879 A | 10/1998 | Goldberg |
| 5,826,085 A | 10/1998 | Bennet |
| 5,838,909 A | 11/1998 | Roy et al. |
| 5,841,980 A | 11/1998 | Waters et al. |
| 5,862,339 A | 1/1999 | Bonnaure et al. |
| 5,893,106 A | 4/1999 | Brobst et al. |
| 5,941,947 A | 8/1999 | Brown |
| 5,956,485 A | 9/1999 | Perlman |
| 5,984,787 A | 11/1999 | Redpath |
| 5,987,376 A | 11/1999 | Olson et al. |
| 6,041,312 A | 3/2000 | Bickerton et al. |
| 6,050,898 A | 4/2000 | Vange |
| 6,098,091 A | 8/2000 | Kisor |
| 6,106,569 A | 8/2000 | Bohrer |
| 6,108,569 A | 8/2000 | Shen |
| 6,142,472 A | 11/2000 | Kliebisch |
| 6,151,632 A | 11/2000 | Chaddha et al. |
| 6,152,824 A | 11/2000 | Rothschild et al. |
| 6,154,782 A | 11/2000 | Kawaguchi et al. |
| 6,203,433 B1 | 3/2001 | Kume |
| 6,219,045 B1 | 4/2001 | Leahy et al. |
| 6,247,017 B1 | 6/2001 | Martin |
| 6,311,209 B1 | 10/2001 | Olson et al. |
| 6,345,297 B1 | 2/2002 | Grimm |
| 6,352,479 B1 | 3/2002 | Sparks |
| 6,363,416 B1 | 3/2002 | Naeimi |
| 6,446,113 B1 | 9/2002 | Ozzie et al. |
| 6,470,022 B1 | 10/2002 | Rochberger |
| 6,487,583 B1 | 11/2002 | Harvey |
| 6,487,678 B1 | 11/2002 | Briskey et al. |
| 6,519,629 B2 | 2/2003 | Harvey |
| 6,530,840 B1 | 3/2003 | Cuomo |
| 6,539,494 B1 | 3/2003 | Abramson et al. |
| 6,549,946 B1 | 4/2003 | Fisher |
| 6,560,636 B2 | 5/2003 | Cohen et al. |
| 6,561,811 B2 | 5/2003 | Rapoza et al. |
| 6,577,628 B1 | 6/2003 | Hejza |
| 6,587,874 B1 | 7/2003 | Golla |
| 6,607,444 B2 | 8/2003 | Takahashi et al. |
| 6,631,412 B1 | 10/2003 | Glasser et al. |
| 6,654,831 B1 | 11/2003 | Otterness et al. |
| 6,676,521 B1 | 1/2004 | La Mura et al. |
| 6,704,885 B1 | 3/2004 | Salas-Meza et al. |
| 6,748,420 B1 | 6/2004 | Quatrano et al. |
| 6,755,743 B1 | 6/2004 | Yamashita et al. |
| 6,761,636 B2 | 7/2004 | Chung et al. |
| 6,763,371 B1 | 7/2004 | Jandel |
| 6,769,990 B2 | 8/2004 | Cohen |
| 6,799,255 B1 | 9/2004 | Blumenau |
| 6,839,435 B1 | 1/2005 | Lijima et al. |
| 6,844,893 B1 | 1/2005 | Miller et al. |
| 6,931,446 B1 | 8/2005 | Cox et al. |
| 7,003,550 B1 | 2/2006 | Cleasby et al. |
| 7,016,942 B1 | 3/2006 | Odom |
| 7,018,295 B2 | 3/2006 | Sakaguchi et al. |
| 7,025,675 B2 | 4/2006 | Fogel |
| 7,035,919 B1 | 4/2006 | Lee et al. |
| 7,056,217 B1 | 6/2006 | Pelkey et al. |
| 7,073,187 B1 | 7/2006 | Hendricks et al. |
| 7,089,301 B1 | 8/2006 | Labio et al. |
| 7,107,312 B2 | 9/2006 | Hackbarth et al. |
| 7,155,515 B1 | 12/2006 | Brown et al. |
| 7,165,107 B2 | 1/2007 | Pouyoul et al. |
| 7,177,950 B2 | 2/2007 | Narayan et al. |
| 7,188,145 B2 | 3/2007 | Lowery et al. |
| 7,203,755 B2 | 4/2007 | Zhu et al. |
| 7,290,264 B1 | 10/2007 | Powers et al. |
| 7,366,185 B2 | 4/2008 | Bush |
| 7,454,458 B2 | 11/2008 | Islam et al. |
| 7,523,163 B2 | 4/2009 | Zhu et al. |
| 7,539,216 B2 | 5/2009 | Johns et al. |
| 7,587,465 B1 | 9/2009 | Muchow |
| 7,613,800 B2 | 11/2009 | Dhupelia |
| 7,614,955 B2 | 11/2009 | Farnham et al. |
| 7,640,298 B2 | 12/2009 | Berg |
| 7,680,908 B2 | 3/2010 | Gates, III et al. |
| 7,711,847 B2 | 5/2010 | Dhupelia |
| 7,720,908 B1 | 5/2010 | Newson et al. |
| 7,730,206 B2 | 6/2010 | Newson et al. |
| 7,792,902 B2 | 9/2010 | Chatani |
| 7,822,809 B2 | 10/2010 | Dhupelia |
| 7,831,666 B2 | 11/2010 | Chatani et al. |
| 7,846,024 B2 | 12/2010 | Graepel et al. |
| 7,877,509 B2 | 1/2011 | Dhupelia |
| 7,899,017 B2 | 3/2011 | Yu et al. |
| 7,908,393 B2 | 3/2011 | Marr et al. |
| 7,930,345 B2 | 4/2011 | Dhupelia |
| 7,962,549 B2 | 6/2011 | Dhupelia |
| 8,032,619 B2 | 10/2011 | Kato et al. |
| 8,050,272 B2 | 11/2011 | Chaturvedi et al. |
| 8,051,180 B2 | 11/2011 | Mazzaferri et al. |
| 8,131,802 B2 | 3/2012 | Jacob |
| 8,214,489 B2 | 7/2012 | Ballette et al. |
| 8,328,610 B2 | 12/2012 | Shimura et al. |
| 8,335,813 B2 | 12/2012 | Sun et al. |
| 8,402,124 B1 | 3/2013 | Barillaud et al. |
| 8,425,330 B1 | 4/2013 | Kislyi et al. |
| 8,554,842 B2 | 10/2013 | Maehiro |
| 8,560,707 B2 | 10/2013 | Jacob |
| 8,719,375 B2 | 5/2014 | Hildreth et al. |
| 8,725,874 B2 | 5/2014 | Keohane et al. |
| 8,727,892 B1 | 5/2014 | Chun |
| 8,856,233 B2 | 10/2014 | Lacapra et al. |
| 8,965,978 B2 | 2/2015 | Chandranmenon et al. |
| 8,972,548 B2 | 3/2015 | Jacob |
| 8,990,305 B2 | 3/2015 | Barkley et al. |
| 9,032,248 B1 | 5/2015 | Petty et al. |
| 9,120,020 B2 | 9/2015 | Michel et al. |
| 9,369,540 B2 | 6/2016 | Lowery et al. |
| 9,516,068 B2 | 12/2016 | Jacob |
| 9,526,993 B2 | 12/2016 | Rom et al. |
| 9,610,504 B2 | 4/2017 | Kislyi et al. |
| 9,656,176 B2 | 5/2017 | Riego |
| 9,729,621 B2 | 8/2017 | Jacob |
| 9,762,631 B2 | 9/2017 | Chatani |
| 9,764,240 B2 | 9/2017 | Khan |
| 9,931,571 B2 | 4/2018 | Cho |
| 10,063,631 B2 | 8/2018 | Jacob |
| 10,130,872 B2 | 11/2018 | Buhr et al. |
| 10,130,889 B2 | 11/2018 | Riego |
| 10,343,069 B2 | 7/2019 | Noss |
| 10,449,458 B2 | 10/2019 | Torres |
| 10,695,671 B2 | 6/2020 | Trombetta et al. |
| 10,765,952 B2 | 9/2020 | Trombetta |
| 10,987,593 B2 | 4/2021 | Trombetta |
| 2001/0009868 A1 | 7/2001 | Sakaguchi et al. |
| 2001/0024974 A1 | 9/2001 | Cohen |
| 2001/0037466 A1 | 11/2001 | Fukutake et al. |
| 2001/0044339 A1 | 11/2001 | Cordero et al. |
| 2002/0023117 A1 | 2/2002 | Bernardin et al. |
| 2002/0035604 A1 | 3/2002 | Cohen et al. |
| 2002/0042830 A1 | 4/2002 | Bose et al. |
| 2002/0049086 A1 | 4/2002 | Otsu |
| 2002/0062348 A1 | 5/2002 | Maehiro |

(56) References Cited

U.S. PATENT DOCUMENTS

| | | |
|---|---|---|
| 2002/0075844 A1 | 6/2002 | Hagen |
| 2002/0075940 A1 | 6/2002 | Haartsen |
| 2002/0082077 A1 | 6/2002 | Johnson |
| 2002/0082086 A1 | 6/2002 | Scallie |
| 2002/0086732 A1 | 7/2002 | Kirmse et al. |
| 2002/0107934 A1 | 8/2002 | Lowery et al. |
| 2002/0107935 A1 | 8/2002 | Lowery et al. |
| 2002/0115488 A1 | 8/2002 | Berry |
| 2002/0133707 A1 | 9/2002 | Newcombe |
| 2002/0137565 A1 | 9/2002 | Blanco |
| 2002/0142842 A1 | 10/2002 | Easley et al. |
| 2002/0156917 A1 | 10/2002 | Nye |
| 2002/0169889 A1 | 11/2002 | Yang et al. |
| 2002/0178260 A1 | 11/2002 | Chang |
| 2002/0184070 A1 | 12/2002 | Chen et al. |
| 2003/0018719 A1 | 1/2003 | Ruths |
| 2003/0073494 A1 | 4/2003 | Kalpakian et al. |
| 2003/0093669 A1 | 5/2003 | Morals et al. |
| 2003/0126245 A1 | 7/2003 | Feltin et al. |
| 2003/0167343 A1 | 9/2003 | Furuno |
| 2003/0190960 A1 | 10/2003 | Jokipii |
| 2003/0204566 A1 | 10/2003 | Dhupelia |
| 2003/0204593 A1 | 10/2003 | Brown et al. |
| 2003/0214943 A1 | 11/2003 | Engstrom et al. |
| 2003/0216181 A1 | 11/2003 | Daniell et al. |
| 2003/0217135 A1 | 11/2003 | Chatani |
| 2003/0217158 A1 | 11/2003 | van Datta |
| 2003/0233537 A1 | 12/2003 | Wohlgemuth et al. |
| 2004/0001476 A1 | 1/2004 | Islam et al. |
| 2004/0002384 A1 | 1/2004 | Multerer et al. |
| 2004/0024879 A1 | 2/2004 | Dingman |
| 2004/0030787 A1 | 2/2004 | Jandel |
| 2004/0031052 A1 | 2/2004 | Wannamaker et al. |
| 2004/0053690 A1 | 3/2004 | Fogel |
| 2004/0059711 A1 | 3/2004 | Jandel |
| 2004/0117443 A1 | 6/2004 | Barsness |
| 2004/0139228 A1 | 7/2004 | Takeda |
| 2005/0038836 A1 | 2/2005 | Wang |
| 2005/0068894 A1 | 3/2005 | Yu et al. |
| 2005/0105526 A1 | 5/2005 | Stiemerling |
| 2005/0144521 A1 | 6/2005 | Werner |
| 2005/0181878 A1 | 8/2005 | Danieli et al. |
| 2005/0245317 A1 | 11/2005 | Arthur et al. |
| 2005/0251577 A1 | 11/2005 | Guo |
| 2005/0259637 A1 | 11/2005 | Chu |
| 2005/0262411 A1 | 11/2005 | Vertes |
| 2006/0015560 A1 | 1/2006 | MacAuley et al. |
| 2006/0047836 A1 | 3/2006 | Rao et al. |
| 2006/0075127 A1 | 4/2006 | Juncker |
| 2006/0085792 A1 | 4/2006 | Traut |
| 2006/0092942 A1 | 5/2006 | Newson et al. |
| 2006/0100020 A1 | 5/2006 | Kasai |
| 2006/0121991 A1 | 6/2006 | Borinik et al. |
| 2006/0142085 A1 | 6/2006 | Kim |
| 2006/0168107 A1 | 6/2006 | Balan et al. |
| 2006/0164974 A1 | 7/2006 | Ramalho et al. |
| 2006/0190540 A1 | 8/2006 | Chatani |
| 2006/0200551 A1 | 9/2006 | Bali et al. |
| 2006/0218274 A1 | 9/2006 | Labio et al. |
| 2006/0218275 A1 | 9/2006 | Labio et al. |
| 2006/0247011 A1 | 11/2006 | Gagner |
| 2006/0248144 A1 | 11/2006 | Zhu et al. |
| 2006/0253595 A1 | 11/2006 | van Datta |
| 2006/0258463 A1 | 11/2006 | Cugno et al. |
| 2006/0288103 A1 | 12/2006 | Gobara |
| 2007/0058792 A1 | 3/2007 | Chaudhari |
| 2007/0061460 A1 | 3/2007 | Khan |
| 2007/0076729 A1 | 4/2007 | Takeda |
| 2007/0082659 A1 | 4/2007 | Nevalainen |
| 2007/0087799 A1 | 4/2007 | Van Luchene |
| 2007/0094325 A1 | 4/2007 | Ih et al. |
| 2007/0099702 A1 | 5/2007 | Tupper |
| 2007/0117635 A1 | 5/2007 | Spanton et al. |
| 2007/0165629 A1 | 7/2007 | Chaturvedi |
| 2007/0173325 A1 | 7/2007 | Shaw et al. |
| 2007/0174399 A1 | 7/2007 | Ogle et al. |
| 2007/0191109 A1 | 8/2007 | Crowder |
| 2007/0207860 A1 | 9/2007 | Yamauchi et al. |
| 2007/0208748 A1 | 9/2007 | Li |
| 2007/0217436 A1 | 9/2007 | Markley |
| 2007/0218997 A1 | 9/2007 | Cho |
| 2007/0233865 A1 | 10/2007 | Garbow et al. |
| 2007/0288598 A1 | 12/2007 | Edeker et al. |
| 2007/0291706 A1 | 12/2007 | Miller et al. |
| 2008/0049755 A1 | 2/2008 | Gannon et al. |
| 2008/0189365 A1 | 8/2008 | Narayanaswami et al. |
| 2008/0242420 A1 | 10/2008 | Graepel et al. |
| 2008/0243953 A1 | 10/2008 | Wu et al. |
| 2008/0280686 A1 | 11/2008 | Dhupelia et al. |
| 2008/0291839 A1 | 11/2008 | Hooper et al. |
| 2009/0006545 A1 | 1/2009 | Dhupelia |
| 2009/0006604 A1 | 1/2009 | Dhupelia |
| 2009/0042646 A1 | 2/2009 | Sarkar et al. |
| 2009/0077245 A1 | 3/2009 | Smelyansky |
| 2009/0089363 A1 | 4/2009 | Keohane et al. |
| 2009/0094370 A1 | 4/2009 | Jacob |
| 2009/0104956 A1 | 4/2009 | Kay et al. |
| 2009/0111576 A1 | 4/2009 | Ostergren et al. |
| 2009/0113060 A1 | 4/2009 | Jacob |
| 2009/0138610 A1 | 5/2009 | Gobara |
| 2009/0157882 A1 | 6/2009 | Kashyap |
| 2009/0240821 A1 | 9/2009 | Juncker |
| 2009/0287828 A1 | 11/2009 | Wei et al. |
| 2009/0325711 A1 | 12/2009 | Bronstein et al. |
| 2009/0325712 A1 | 12/2009 | Rance |
| 2010/0153496 A1 | 6/2010 | Heinla |
| 2010/0279767 A1 | 11/2010 | Dhupelia |
| 2010/0285872 A1 | 11/2010 | Dhupelia |
| 2010/0287239 A1 | 11/2010 | Chatani |
| 2011/0177863 A1 | 7/2011 | Davidsion et al. |
| 2012/0142429 A1 | 6/2012 | Muller |
| 2012/0166651 A1 | 6/2012 | Jacob |
| 2012/0166994 A1 | 6/2012 | Aonuma et al. |
| 2012/0210355 A1 | 8/2012 | Kim et al. |
| 2012/0311041 A1 | 12/2012 | Aonuma et al. |
| 2012/0322560 A1 | 12/2012 | Joo |
| 2013/0007013 A1 | 1/2013 | Geisner et al. |
| 2013/0260896 A1 | 10/2013 | Miura et al. |
| 2013/0304931 A1 | 11/2013 | Jacob |
| 2013/0310181 A1 | 11/2013 | Kislyi et al. |
| 2013/0344963 A1* | 12/2013 | Gupta .................. A63F 13/48 463/40 |
| 2014/0256449 A1 | 9/2014 | Chatani et al. |
| 2014/0274402 A1 | 9/2014 | Michel et al. |
| 2015/0038233 A1 | 2/2015 | Rom et al. |
| 2015/0127731 A1 | 5/2015 | Hamada et al. |
| 2015/0180958 A1 | 6/2015 | Jacob |
| 2016/0001183 A1 | 1/2016 | Harvey et al. |
| 2016/0082355 A1 | 3/2016 | Kobayashi et al. |
| 2016/0346701 A1 | 12/2016 | George |
| 2017/0182423 A1 | 6/2017 | Leppinen et al. |
| 2017/0291109 A1 | 10/2017 | Jensen |
| 2018/0013802 A1 | 1/2018 | Chatani |
| 2018/0013820 A1 | 1/2018 | Jacob |
| 2018/0102029 A1 | 4/2018 | Leslie et al. |
| 2018/0193741 A1 | 7/2018 | Kiwada et al. |
| 2018/0250591 A1 | 9/2018 | Prado Rojas et al. |
| 2018/0256982 A1 | 9/2018 | Kuneida et al. |
| 2018/0290060 A1 | 10/2018 | Noss |
| 2019/0057686 A1 | 2/2019 | Yong |
| 2019/0262717 A1 | 8/2019 | Thielbar |
| 2019/0266845 A1 | 8/2019 | Trombetta et al. |
| 2019/0282907 A1 | 9/2019 | Jensen |
| 2019/0310743 A1 | 10/2019 | Yamashita |
| 2020/0086217 A1 | 3/2020 | Trombetta et al. |
| 2020/0094148 A1 | 3/2020 | Trombetta et al. |
| 2020/0097147 A1 | 3/2020 | Trombetta et al. |
| 2020/0101377 A1 | 4/2020 | Trombetta et al. |

(56) References Cited

U.S. PATENT DOCUMENTS

| | | | |
|---|---|---|---|
| 2020/0213321 A1 | 7/2020 | Herman |
| 2021/0245059 A1 | 8/2021 | Trombetta |

FOREIGN PATENT DOCUMENTS

| | | |
|---|---|---|
| EP | 1499987 | 1/2005 |
| EP | 2360874 | 8/2011 |
| EP | 2360875 | 8/2011 |
| GB | 2325543 A | 11/1998 |
| IN | 269863 | 12/2015 |
| JP | 05-022346 | 1/1993 |
| JP | 63-232725 | 9/1998 |
| JP | 11-234326 | 8/1999 |
| JP | 2000-124939 | 4/2000 |
| JP | 2000-157724 | 6/2000 |
| JP | 2001-187273 | 7/2001 |
| JP | 2001-314657 | 11/2001 |
| JP | 2002-011251 | 1/2002 |
| JP | 2003-099337 | 4/2003 |
| TW | 201347493 | 11/2013 |
| TW | I491229 | 7/2015 |
| WO | WO 2000/05854 | 2/2000 |
| WO | WO 2000/10099 | 2/2000 |
| WO | WO 2000/68864 | 11/2000 |
| WO | WO 2001/63423 | 8/2001 |
| WO | WO 2001/82678 | 11/2001 |
| WO | WO 2002/35769 | 5/2002 |
| WO | WO 2003/091894 | 11/2003 |
| WO | WO 2003/100643 | 12/2003 |
| WO | WO 2004/063843 | 7/2004 |
| WO | WO 2005/088466 | 9/2005 |
| WO | WO 2006/023508 | 3/2006 |
| WO | WO 2009/045475 | 4/2009 |
| WO | WO 2020/060877 | 3/2020 |
| WO | WO 2020/060879 | 3/2020 |
| WO | WO 2020/060880 | 3/2020 |
| WO | WO 2020/068462 | 4/2020 |

OTHER PUBLICATIONS

"Brief for Appellee," in re Masayuki Chatani et al., U.S. Court of Appeals for the Federal Circuit (2007-1150) (May 21, 2007).
"Brief of Appellants," in re Masayuki Chatani et al., U.S. Court of Appeals for the Federal Circuit(2007-1150) (Mar. 23, 2007).
"In Re Masayuki Chatani and Glen Van Datta," United States Court of Appeals for the Federal Circuit, 2007-1150 (U.S. Appl. No. 11/211,128), Nov. 19, 2007.
"Petition for Panel Rehearing," In Re Masayuki Chatani and Glen Van Datta, Appeal From the United States Patent and Trademark Office, Board of Patent Appeals and Interferences, In the United States Court of Appeals for the Federal Circuit, 2007-1150 (U.S. Appl. No. 10/211,128), Jan. 3, 2008.
"Reply Brief of Appellants," In re Masayuki Chatani et al., U.S. Court of Appeals for the Federal Circuit (2007-1150) (Jun. 4, 2007).
"Technical Issues of establishing any-to-any 2-way real-time communications over the internet," Apr. 24, 2005, URL http://web.archive.org/web/20050424081036/.
Aronson, Jesse. "Using Groupings for Networked Gaming," Gamasutra.com, Jun. 21, 2000.
Audet, F. Nat Behavioral Requirements for Unicast UDP, BEHAVE Internet-Draft, Jul. 15, 2005.
Boulic, Ronan etl al. "Integration of Motion Control Techniques for Virtual Human and Avatar Real-Time Animation," Swiss Fedl Inst. Of Tech., Lausanne, Switzerland, Sep. 1997.
Chiueh, Tzi-cker, "Distributed Systems Support for Networked Games," Computer Science Department, State University of New York at Stony Brook, Stony Brook, NY, May 1997.
Cisco Systems Inc., "Network Flow Management: Resource Reservation for Multimedia Flows," Mar. 19, 1999.
Diot et al., "A Distributed Architecture for Multiplayer Interactive Applications on the Internet", Aug. 1999, Network, IEEE, vol. 13, Issue 4, Jul.-Aug. 1999, pp. 6-15.
Fiesta and Borland, "Netscape alumni to launch P2P company", Aug. 2, 2001, (avaiable at http://news.cnet.com/news/0-1005-202-6766377.html).
Hagsand O: Interactive Multiuser Ves in the DIVE System: IEEE Multimedia, IEEE Service Center, New York, NY, US vol. 3, No. 1, 21 Mar. 21, 1996, pp. 30-39, XP000582951 ISSN: 1070-986X.
Hanada, S. "The Design of Network Game and DirectPlay," Inside Windows, Softbank K.K., vol. 4, pp. 42-57, Apr. 1, 1998.
Rosenberg, J. Interactive Connectivity Establishment (ICE): A Methodology for Network Address Translator (NAT) Traversal for Multimedia Session Establishment Protocols, Mmusic Internet-Draft, Jul. 19, 2004.
Rosenberg, J. Interactive Connectivity Establishment (ICE): A Methodology for Network Address Translator (NAT) Traversal for Offer/Answer Protocols, Mmusic Internet-Draft, Jul. 17, 2005.
Rosenberg, J. Interactive Connectivity Establishment (ICE): A Methodology for Network Address Translator (NAT) Traversal for Multimedia Session Establishment Protocols, Mmusic Internet-Draft, Oct. 25, 2004.
Rosenberg, J. Interactive Connectivity Establishment (ICE): A Methodology for Network Address Translator (NAT) Traversal for Off/Answer Protocols, Mmusic Internet-Draft, Jan. 16, 2007.
Rosenberg, J. "Simple Traversal of UDP Through Network Address Translators (NAT)," Behave Internet-Draft, Jul. 17, 2005.
Rosenberg, J. STUN—Simple Traversal of User Datagram Protocols (UDP) Throught Network Address Translators (NATs), Network Working Group, Mar. 2003.
Rosenberg, J. Traversal using Relay NAT (TURN), MIDCOM Internet-Draft, Oct. 20, 2003.
Takeda, Y. Symmetric NAT Traversal Using STUN, Internet Engineering Task Force, Jun. 2003.
PCT/US03/08682 International Search Report dated Oct. 14, 2003.
PCT/US03/12668 International Search Report dated Jul. 17, 2003.
PCT/US08/11415 Search Report and Written Opinion dated Dec. 5, 2008.
PCT Application No. PCT/US2019/051140 International Search Report and Written Opinion dated Nov. 15, 2019.
PCT Application No. PCT/US2019/051146 International Search Report and Written Opinion dated Nov. 18, 2019.
PCT Application No. PCT/US2019/051157 International Search Report and Written Opinion dated Oct. 16, 2019.
PCT Application No. PCT/US2019/051150 International Search Report and Written Opinion dated Nov. 4, 2019.
EP 037211413, European Search Report dated Jun. 30, 2005.
EP 08835745.4 Extended European Search Report dated Jul. 22, 2011.
EP 11004182.9 Extended European Search Report dated Jul. 14, 2011.
EP 11004181.1 Extended European Search Report dated Jul. 22, 2011.
U.S. Appl. No. 16/135,273 Office Action dated Jan. 17, 2020.
U.S. Appl. No. 16/138,306 Office Action dated Apr. 8, 2020.
U.S. Appl. No. 16/137,953 Office Action dated Nov. 27, 2019.
U.S. Appl. No. 16/146,645 Office Action dated Sep. 20, 2019.
U.S. Appl. No. 16/138,306 Final Office Action dated Dec. 3, 2020.
U.S. Appl. No. 16/135,273 Final Office Action dated Oct. 9, 2020.
PCT Application No. PCT/US2019/051140 International Preliminary Report on Patentability dated Mar. 23, 2021.
PCT Application No. PCT/US2019/051146 International Preliminary Report on Patentability dated Mar. 23, 2021.
PCT Application No. PCT/US2019/051157 International Preliminary Report on Patentability dated Mar. 23, 2021.
PCT Application No. PCT/US2019/051150 International Preliminary Report on Patentability dated Mar. 23, 2021.
U.S. Appl. No. 16/138,306 Office Action dated May 26, 2021.
EP 19863059.2 Extended European Search Report dated May 13, 2022.
U.S. Appl. No. 17/241,829 Office Action dated Apr. 29, 2022.

* cited by examiner

ESTABLISHING AND MANAGING MULTIPLAYER SESSIONS

CROSS-REFERENCE TO RELATED APPLICATIONS

The present application is a continuation and claims the priority benefit of U.S. patent application Ser. No. 16/146,645 filed Sep. 28, 2018, now U.S. Pat. No. 10,695,671, the disclosure of which is incorporated herein by reference.

BACKGROUND

Field of the Invention

The present technology pertains to providing multiuser sessions. More specifically, the present technology may provide for establishing and managing multiuser sessions.

Description of the Related Art

Multiuser gameplay is a popular and growing segment of gameplay. Multiuser gameplay may involve social interactions between a user and peers (e.g., friends). Presently available interactions typically occur in a group at a platform level or in a group (e.g., team) within a game. Where a specific team may wish to play together in different games or different sessions, such game group must generally be rebuilt in each different game, which may include different features and parameters depending on each game despite some commonalities between different grouping processes. Further, steps to build a game group may be different in each game.

Due to the popularity of multiuser games and playing games with a set group of peers (e.g., friends), significant delays and repeated and/or different steps in each game can have significant (and negative) impact on user experience. Such group building may, for example, detract from the user experience when grouping processes—which may be repetitive to different extents—cause delay each time the group changes games. Further, such grouping must be repeated for groups of player that regularly play different games together, resulting in delayed gameplay.

There is, therefore, a need in the art for systems and methods for establishing and managing multiuser sessions.

SUMMARY OF THE PRESENTLY CLAIMED INVENTION

Embodiments of the present invention include systems and methods for establishing and managing multiuser sessions. A plurality of interactive content titles and at least one activity template associated with each of the interactive content titles may be stored in memory. Input regarding a selected activity associated with one of the interactive content titles stored in memory may be received. An activity template associated with the selected activity from memory may be retrieve. A session based at least on the activity properties may be established. A user may be assigned as a leader of the established session. Each of a plurality of peers may be added to an available participant slot in accordance with leader input. The selected activity may be automatically initiated within the established session.

Various embodiments may include methods for establishing and managing multiuser sessions. Such methods may include receiving input regarding a selected activity associated with an interactive content title. Such methods may include retrieving an activity template associated with the selected activity. The activity template may include activity properties specifying at least a minimum number of participants to start the selected activity. Such methods may include establishing a session based at least on the activity properties. The session may have a plurality of participant slots based on the minimum number of participants specified by the retrieved activity template. Such methods may include assigning a user as a leader of the established session. The leader may have leadership responsibilities including at least adding peers as participants in the session. Such methods may include adding each of a plurality of peers to each available participant slot in accordance with leader input. Such methods may include automatically initiating the selected activity within the established session.

Additional embodiments may include systems for establishing and managing multiuser sessions. Such systems may include memory that stores a plurality of interactive content titles and at least one activity template associated with each of the interactive content titles. Such system may include a processor that executes instructions stored in memory. Execution of the instructions by the processor may receive input regarding a selected activity associated with one of the interactive content titles stored in memory. Execution of the instructions by the processor may retrieve an activity template associated with the selected activity from the at least one activity template. The activity template may include activity properties specifying at least a minimum number of participants to start the selected activity. Execution of the instructions by the processor may establish a session based at least on the activity properties. The session may have a plurality of participant slots based on the minimum number of participants specified by the retrieved activity template. Execution of the instructions by the processor may assign a user as a leader of the established session. The leader may have leadership responsibilities including at least adding peers as participants in the session. Execution of the instructions by the processor may add each of a plurality of peers to each available participant slot in accordance with leader input. Execution of the instructions by the processor may automatically initiate the selected activity within the established session.

Further embodiments include non-transitory computer-readable storage media having embodied thereon a program executable by a processor to establish and manage multiuser sessions.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Embodiments of the present invention include systems and methods for establishing and managing multiuser sessions. A user may select an activity within an interactive content title that requires multiple users to participate in the activity. As such, the user may create a lead session to invite peers and/or interact with such peers before, during, or after participating in the selected activity. Such selected activity may be associated with an interactive content title. An activity template associated with the selected activity may be retrieved and include data regarding activity properties of the selected activity. A lead session may be established with lead session properties based on at least the activity properties. Such lead session may also include a plurality of participant slots, wherein each slot is occupied by a participating user or peer. A user may be assigned as a leader of the lead session. Such leader may have leadership responsibilities including at least adding or removing peers from the lead session.

Figure 1:
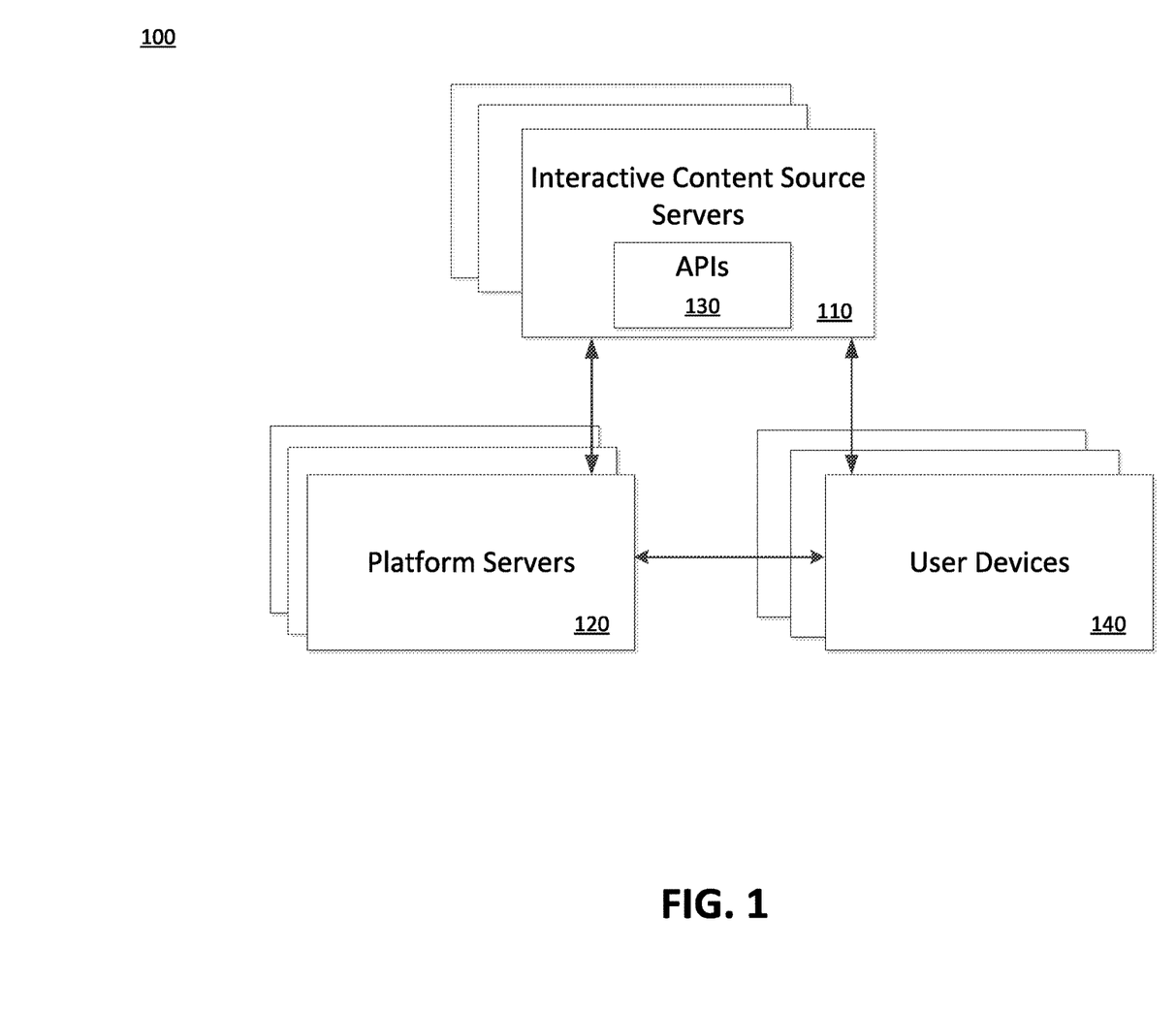
FIG. 1 illustrates an exemplary network environment in which a system for establishing and managing multiuser sessions may be implemented.

FIG. 1 illustrates an exemplary network environment 100 in which a system for establishing and managing multiuser lead sessions can occur. The network environment 100 may include one or more interactive content source servers 110 that provide interactive content (e.g., video games, interactive video, etc.), platform servers 120, and one or more user devices 140.

Interactive content source servers 110 may maintain and host interactive content titles available for play to a user device 140 over a communication network. Such interactive content servers 110 may be implemented in the cloud (e.g., one or more cloud servers). Each interactive content title may include one or more activities available within the content title. The one or more activities may be playable by a single user or by multiple users. Each interactive content title may include one or more templates corresponding to one or more activities available within the content title. Each template may provide a structured data set regarding the corresponding activities and that may be used as the basis for tracking and displaying information regarding the corresponding activities in real-time. Each template may also provide data regarding establishing a lead session for multiuser interactions and for participation in multiple interactive contents as a single lead session. Such lead session may be implemented at the interactive content source servers 110 and/or the platform servers 120.

In one example, the interactive content title is a video game title, and the one or more templates may correspond to different modes of competitive gameplay available within that game title. In another example, the one or more templates may correspond to different chapters of an interactive storyline. Each template may be associated with a portion of the interactive content title where the corresponding activity starts within the interactive content title. For example, the template may include a waypoint within a portion of a game (e.g., at a specific game environment location at a specific point in time in the game storyline) where an activity starts. In another example, the template may virtually teleport a character of the user to the location within the game environment that is closest to the start of the associated activity.

The template may also be associated with establishing a lead session to group users for participation in the associated activity and to provide group management. Such template associated with the lead session may further provide activity requirements (e.g., number of players maximum and/or minimum, skill level and/or rank, character level and/or rank, user device requirements, etc.) required to launch the selected activity (e.g., competitive match). Each template may be updated, edited, or removed, or new templates may be created. The one or more templates may be stored at the interactive content source servers 110 or at platform server 120 and retrieved therefrom.

The platform servers 120 may be responsible for communicating with the different interactive content source servers 110 in order to establish and manage a lead session or a social session. Such platform servers 120 may be implemented on one or more cloud servers. The interactive content source servers 110 may communicate with multiple platform servers 120. The platform servers 120 may also carry out instructions, for example, for establishing a lead session having lead session properties and a plurality of participant slots. Such lead session properties may be based off of the activity requirements (e.g., number of players maximum and/or minimum, type of skill, skill level and/or rank, type of character/role, character level and/or rank, user device requirements, etc.) of the template associated with the selected activity and/or user preference (e.g., limiting lead session to certain peers setting the lead session to private and/or by invite only, requiring a skill level to join, etc.). The lead session may be established by a platform server 120 associated with a user or a platform server 120 associated with a peer. Such lead session can include two or more users and can provide communication between the users (e.g., voice chat, direct messaging, text chat, screen sharing, video chat, etc.) within the lead session. The platform servers 120 may further carry out instructions, for example, to start or launch the selected activity and enter the lead session into the launched activity.

The interactive content titles and their corresponding activities may be provided through an application programming interface (API) 130, which allows various types of interactive content source servers 110 to communicate with different platform servers 120 and different user devices 140. API 130 may be specific to the particular computer programming language, operating system, protocols, etc., of the interactive content source servers 110 providing the interactive content titles, the platform servers 120 providing the associated templates, and user devices 140 receiving the same. In a network environment 100 that includes multiple different types of interactive content source servers 110 (or platform servers 120 or user devices 140), there may likewise be a corresponding number of APIs 130.

The user device 140 may include a plurality of different types of computing devices. For example, the user device 140 may include any number of different gaming consoles, mobile devices, laptops, and desktops. Such user devices 140 may also be configured to access data from other storage media, such as, but not limited to memory cards or disk drives as may be appropriate in the case of downloaded services. Such devices 140 may include standard hardware computing components such as, but not limited to network and media interfaces, non-transitory computer-readable storage (memory), and processors for executing instructions that may be stored in memory. These user devices 140 may also run using a variety of different operating systems (e.g., iOS, Android), applications or computing languages (e.g., C++, JavaScript). An exemplary user device 140 is described in detail herein with respect to FIG. 4.

Figure 2:
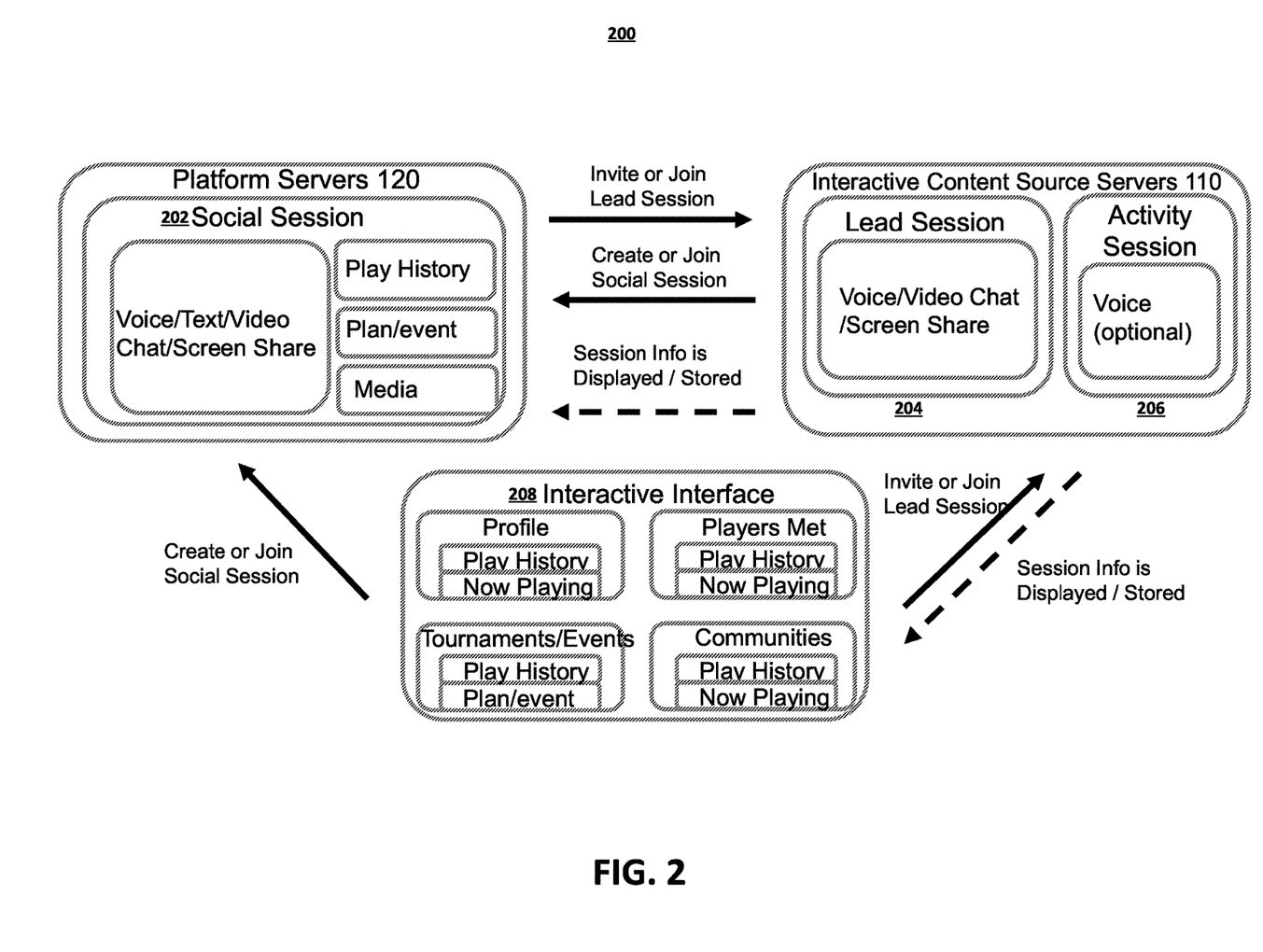
FIG. 2 illustrates a detailed exemplary network in which a system for establishing and managing multiuser sessions may be implemented.

In the exemplary network environment 200 of FIG. 2, an exemplary social session 202, an exemplary lead session 204, an exemplary activity session 206, and an exemplary interactive interface 208 are illustrated. A social session 202 may be established without an activity selection or without an activity template. Such social session 202 may be created at the platform server 120 by a user to group the user and peers (e.g., friends) together prior to an activity selection and to provide communication (e.g., voice chat, video chat, text chat, screen sharing, etc.) to the social session. A user of the social session 202 may receive an invitation to join a peer in an established lead session 204 to participate in an activity selected by the peer. A user of the social session 202 may also create a lead session 204 and invite peers to join such lead session 204. Activities that the social session 202 may qualify for may be displayed on the interactive interface 208 to each of the user and the peers of the social session 202 for selection.

An exemplary lead session 204 may be established on the interactive content source servers 110 when a user selects an activity to participate in. Such lead session 204 may include lead session properties. The lead session properties may be based on at least the activity properties and/or user preferences (e.g., limiting lead session to certain peers setting the lead session to private and/or by invite only, requiring a skill level to join, etc.). The lead session 204 may further include a plurality of participant slots. Such participant slots may be based on the minimum and/or maximum number of players that can participate in the selected activity. Each participant slot may be occupied by a participant (e.g., a user or peer). Such participant may be required to satisfy the lead session properties to occupy a slot. For example, the lead session property may require a certain skill level to join, and the participant may possess such skill level, thereby allowing the participant to join the lead session and occupy a participant slot.

The lead session 204 may further include one or more spectator slots. Such spectator slots correspond to slots for viewing the activity during the lead session 204 interaction with the activity on spectator devices. The spectator slots may be restriction by some or all of the lead session properties (e.g., hardware and/or software requirements) or the spectator slots may not be restricted. Such spectator slots may not be added or generated until the selected activity has begun.

The lead session 204 can further include lead session history. Such lead session history may be based on past activities completed by the lead session and may include lead session data corresponding to each past activity (e.g., achievements and/or trophies earned by the lead session, activity run time, statistics related to the performance of the lead session in the activity, activity results, past leaders, past peers, etc.). Such lead session history may be displayed on an interactive interface of the user device 140 as part of a user profile or part of a session profile. Such lead session history can allow a former leader or peer to re-establish the session based on the lead session history. Such re-established lead session can include the same lead session properties previously established for the past lead session.

An exemplary activity session 206 may be established on the interactive content source servers 110 for the duration of a selected activity if a lead session 204 is lacking the required number of participants for the selected activity. Such activity session 206 may join the leader and peers of the lead session 204 to the activity session 206 and also join another lead session 204 or individual peers (e.g., peers not part of a lead session) to the activity session 206 until the activity requirements for the selected activity are fulfilled. For example, an activity may require twelve participants and a first lead session and a second lead session having six participants may be joined in an activity session. 206 After the selected activity is completed, the activity session 206 ends.

The leader and peers may remain in the lead session 204, while participating in the activity session 206. In other words, the lead session 204 remains intact during participation by the leader and the peers in the selected activity and the leader and the peers are simultaneous members of the lead session 204 and the activity session 206. As such, the lead session 204 persists during and after the selected activity ends. Further, if the lead session 204 has open participant slots or open spectator slots, other peers may join the lead session 204 during an active activity. For example, while the leader and the current peers are participating in an activity, another peer can join the lead session 204 and can spectate or wait until the leader and the current peers complete the activity. In the same example, the other peer can join the activity if one of the leader or the current peers leaves the activity. Alternatively, the leader and the current peers may be added to the activity session 206, and a placeholder may be established in the lead session 204 for each leader and peer until the activity is completed.

From either an established lead session 204 and/or an activity session, a user can join an established social session 202 or create a social session 202. Further, session data related to activity session may be stored at the platform servers 120 and/or displayed at a social session 202 and/or on an interactive interface 208.

An interactive interface 208 can be established by the platform servers 120 and can be displayed on the user devices 140. Such interactive interface 208 may display available activities, user and/or peer data (e.g., current status, past history, etc.), or available lead sessions 204 to join. Such interactive interface 208 may also allow a user to create a social session 202, join an established social session 202, create a lead session 204 and invite peers, or join an existing lead session 204.

Figure 3:
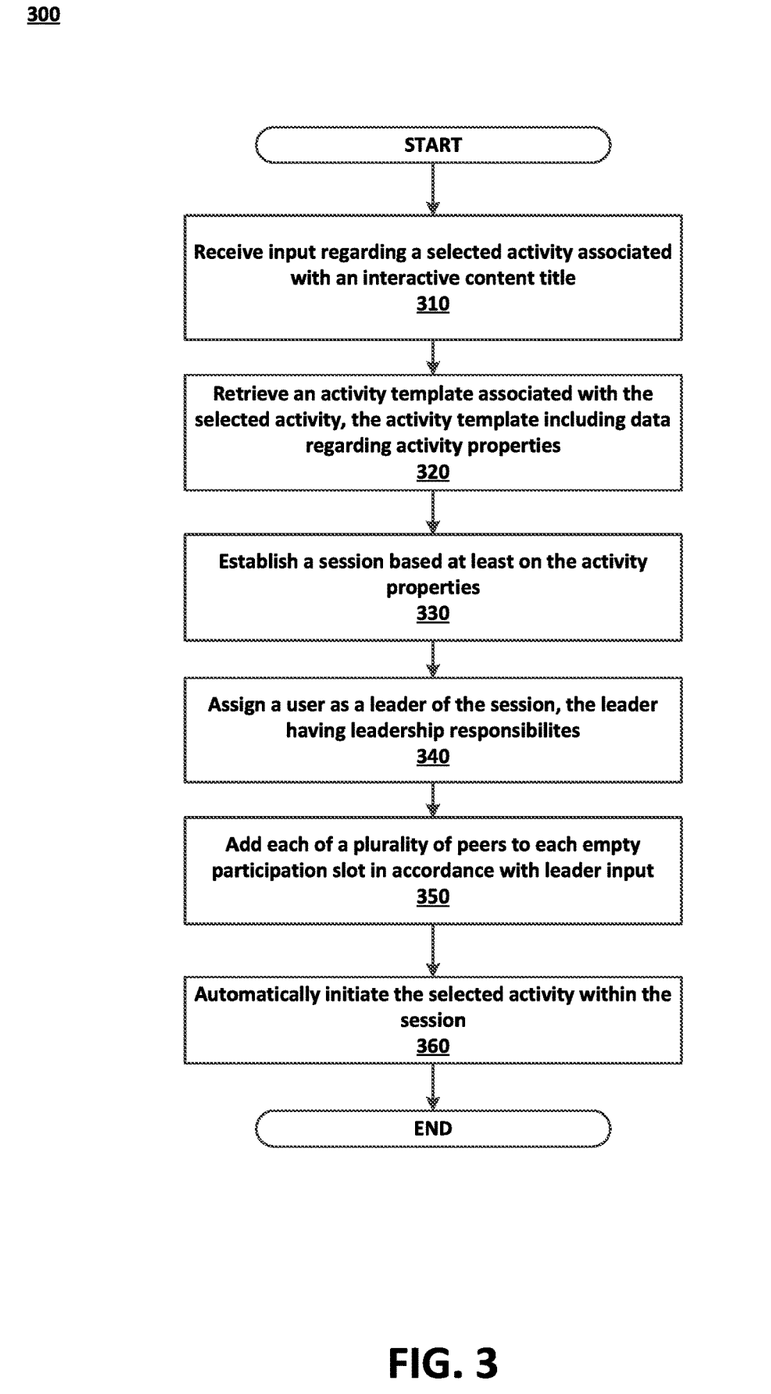
FIG. 3 is a flowchart illustrating an exemplary method for establishing and managing multiuser sessions.

FIG. 3 is a flowchart illustrating an exemplary method 300 for establishing and managing multiuser lead sessions. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 3 are performed in the cloud). The steps identified in FIG. 3 (and the order thereof) are exemplary and may include various alternatives, equivalents, or derivations thereof including but not limited to the order of execution of the same.

In step 310, input regarding a selected activity associated with an interactive content title is received by the platform server 120. Such activity may be an activity requiring multiple user participation (e.g., a dungeon, multi-user quest, competitive match, etc.). Such selection may occur while a user is participating in a different activity of the same or different interactive content title. Further, such selection may occur when the user is not participating in an activity.

In step 320, an activity template may be retrieved by the platform server 120 or the interactive content servers 110. Such activity template may be associated with the selected activity. Such activity template may also include data regarding activity properties (e.g., minimum number of participants, maximum number of participants, hardware and/or software required, user level requirements, etc.) of the selected activity required to start the activity.

In step 330, a lead session 204 may be established by the platform servers 120 or the interactive content servers 110. Such lead session 204 may include a plurality of participation slots corresponding to a maximum number of participants established by the activity template.

In step 340, a user may be assigned as a leader of the lead session 204 by the platform servers 120 or the interactive content servers 110. In one example, the first user to enter a lead session 204 is assigned leader of such lead session 204. Such leader may have leadership responsibilities (e.g., adding or removing peers from the lead session, changing the privacy level of the lead session 204 (e.g., allowing peers to enter the lead session without an invite, requiring an invite to join the lead session, etc.), inviting peers to join the lead session, selecting another activity for the lead session to interact with, etc.). If the leader exits or drops out of the lead session 204, one of a plurality of peers in the lead session 204 may be assigned as the leader. Such assignment may be based on the order of each peer joining the lead session 204. For example, a peer that joined the lead session 204 first may be selected as the leader and the peer that joined the lead session 204 second may be next in line to be assigned the leader. Such assignment may be based on a leadership requirement (e.g., hardware and/or software requirements, peer experience, highest amount of playtime, achievements earned, etc.). For example, the leader may be required to have certain hardware to host an activity.

In step 350, each of a plurality of peers may be added to each empty participant slot in accordance with leader input (e.g., express selections, preferences, profile information) as implemented by the platform servers 120 or the interactive content source servers 110. The plurality of peers may be equal to the number of empty participant slots. Such plurality of peers may be added to the empty participant slots by the leader. The plurality of peers may alternatively be invited to join the lead session 204 and peers who accept the invitation may be added to the empty participant slots. Further, a peer may join a lead session 204 that is not restricted to invite-only. Such lead session 204 may include other restrictions that the peer has satisfied (e.g., the peer must be a "friend" of the leader). The plurality of peers may also be added by matchmaking. Such matchmaking may include matching at least one peer to the lead session 204 based on peer data (e.g., peer experience, peer skill, peer hardware and/or software, etc.) of each peer corresponding to one or more properties of the lead session 204. Such matched peers may automatically added to the lead session 204.

The plurality of peers may be part of social session 202 outside of an interactive content title (e.g., game), as described above. The social session 202 may receive an invitation to join a lead session 204 that is currently participating in an activity or will participate in the activity in the future by a leader or a peer of the lead session 204. Such social session invitation may send an invitation to each peer in the social session 202 to join the lead session, wherein each peer may individually accept the invitation to join the lead session 204. Once a user or a peer is added to a lead session 204, the peer cannot be added to another lead session 204 without leaving the first lead session 204. In other words, a user or a peer can only participate or spectate in one lead session 204 at a time.

In step 360, the selected activity automatically initiated by the interactive content source servers 110 within the established lead session 204 by the platform servers 120 or the interactive content source servers 110 The lead session 204 can provide further communication between the users (e.g., voice chat, direct messaging, text chat, screen sharing, video chat, etc.) during interaction with the activity. After the interaction with the activity has ended or been completed, the existing lead session 204 can persist after leaving the activity. In other words, the participants of the lead session 204 remain together even after the activity has ended.

After the selected activity ends, the leader of the lead session 204 may then select another activity in the same interactive content title to participate in. Such selection of a new activity can modify the existing lead session 204 to satisfy the activity requirements of the new activity. For example, the new activity may require twelve participants while the former activity required six participants. In the same example, the lead session 204 may be modified to add six participant slots to the existing six participant slots, thus opening the lead session 204 to new peers. On the other hand, selection of a new activity may restrict the leader or one of the peers of the lead session 204 from participating in the new activity. For example, if the new activity allows five users, but the lead session 204 currently has six participants, then one of the participants will not participate in the activity. As such, the established lead session 204 can be maintained throughout multiple activities without establishing a new lead session 204 for each activity.

Moreover, if the leader selects an activity in a different interactive content title, the leader may first establish a new social session 202 and add each peer from the existing lead session 204 to the new social session 202. The leader can then select an activity in a different interactive content title, thereby establishing a new lead session 204 within the new interactive content title and can add or invite the social session 202 to the lead session 204, which adds or invites each peer within the new social session 202 to the new user session 204. Such process allows the leader and peer to transition between interactive content titles or between an interactive content title and a platform while reducing risk of failed addition or invites of peers to lead sessions 204.

Multiuser lead sessions as provided and described allow a group of user and peers to interact with multiple activities and/or titles without having to recreate the group of users in each different activity and/or interactive content title, thereby allowing the group of user and peers to maintain interaction with each other through multiple activities and periods between activities.

Figure 4:
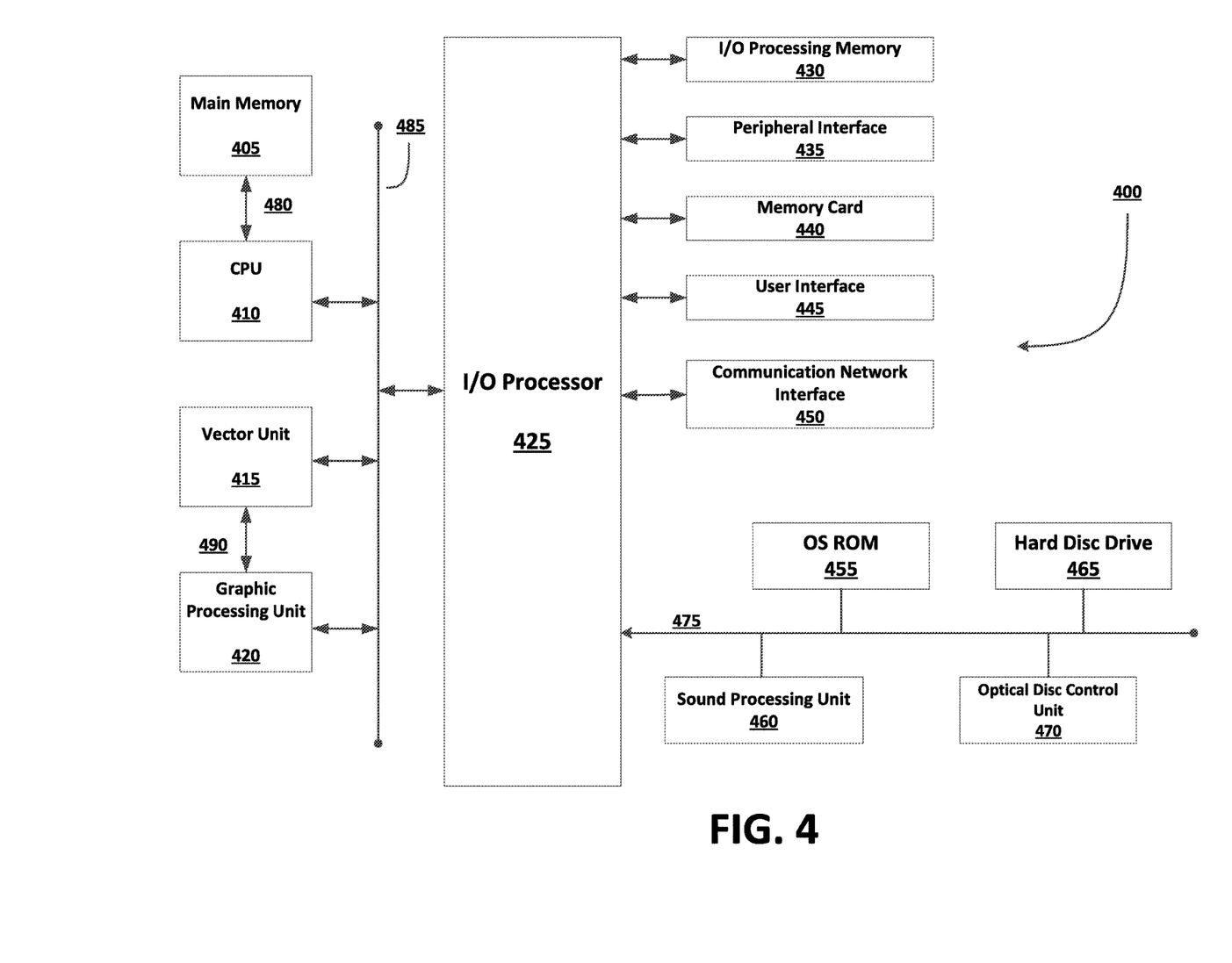
FIG. 4 is an exemplary electronic entertainment system that may be used in establishing and managing multiuser sessions.

FIG. 4 is an exemplary user electronic entertainment system that may be used in launching interactive content and providing dynamic interfaces. The entertainment system 400 of FIG. 4 includes a main memory 405, a central processing unit (CPU) 410, vector unit 415, a graphics processing unit 420, an input/output (I/O) processor 425, an I/O processor memory 430, a peripheral interface 435, a memory card 440, a Universal Serial Bus (USB) interface 445, and a communication network interface 450. The entertainment system 400 further includes an operating system read-only memory (OS ROM) 455, a sound processing unit 460, an optical disc control unit 470, and a hard disc drive 465, which are connected via a bus 475 to the I/O processor 425.

Entertainment system 400 may be an electronic game console. Alternatively, the entertainment system 400 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 410, the vector unit 415, the graphics processing unit 420, and the I/O processor 425 of FIG. 4 communicate via a system bus 485. Further, the CPU 410 of FIG. 4 communicates with the main memory 405 via a dedicated bus 480, while the vector unit 415 and the graphics processing unit 420 may communicate through a dedicated bus 490. The CPU 410 of FIG. 4 executes programs stored in the OS ROM 455 and the main memory 405. The main memory 405 of FIG. 4 may contain pre-stored programs and programs transferred through the I/O Processor 425 from a CD-ROM, DVD-ROM, or other optical disc (not shown) using the optical disc control unit 470. I/O Processor 425 of FIG. 4 may also allow for the introduction of content transferred over a wireless or other communications network (e.g., 4G, LTE, 1G, and so forth). The I/O processor 425 of FIG. 4 primarily controls data exchanges between the various devices of the entertainment system 400 including the CPU 410, the vector unit 415, the graphics processing unit 420, and the peripheral interface 435.

The graphics processing unit 420 of FIG. 4 executes graphics instructions received from the CPU 410 and the vector unit 415 to produce images for display on a display device (not shown). For example, the vector unit 415 of FIG. 4 may transform objects from three-dimensional coordinates to two-dimensional coordinates, and send the two-dimensional coordinates to the graphics processing unit 420. Furthermore, the sound processing unit 460 executes instructions to produce sound signals that are outputted to an audio device such as speakers (not shown). Other devices may be connected to the entertainment system 400 via the USB interface 445, and the communication network interface 450 such as wireless transceivers, which may also be embedded in the system 400 or as a part of some other component such as a processor.

A user of the entertainment system 400 of FIG. 4 provides instructions via the peripheral interface 435 to the CPU 410, which allows for use of a variety of different available peripheral devices (e.g., controllers) known in the art. For example, the user may instruct the CPU 410 to store certain game information on the memory card 440 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for managing social groups across activities, the method comprising:
    storing information in memory regarding a social group associated with a plurality of users;
    establishing a lead session between a first set of user devices associated with an invited set of the users from the social group, wherein network interactions within the lead session are based on an activity template associated with a selected activity, the activity template specifying a number of participant slots and a number of spectator slots;
    adding the first set of the user devices associated with the invited users to the participant slots of the lead session, wherein a different set of the users from the social group are allowed to be added to the spectator slots, and wherein the established lead session is updated to include a second set of user devices associated with the different set of the users; and
    maintaining the lead session for the social group when a different activity is selected, wherein maintaining the lead session for the social group includes maintaining information regarding the network interactions among the user devices included in the lead session in relation to the selected activity and the different activity.

2. The method of claim 1, further comprising assigning one of the users of the user devices included in the lead session as a leader of the lead session, wherein the leader is allowed to exercise leader tasks including at least designating the invited users to add the participant slots, and wherein adding the invited users to the participant slots is based on the leader designation.

3. The method of claim 1, wherein the number of participant slots is based on a minimum number of participants specified by the activity template associated with the selected activity.

4. The method of claim 1, wherein the different activity is associated with a different activity template and the number of participant slots associated with the lead session is modified based on a different minimum number of participants specified by the different activity template.

5. The method of claim 1, further comprising storing session history in memory, wherein the stored session history includes information regarding one or more past activities associated with the lead session of the social group.

6. The method of claim 5, wherein the stored session history further includes data regarding each of the users participating in each of the past activities.

7. The method of claim 1, wherein the lead session is associated with a specified number of the spectator slots.

8. The method of claim 1, wherein establishing the lead session further includes providing a chat functionality for use among the users of the user devices added to the participant slots of the lead session.

9. The method of claim 1, wherein assigning a next leader is based on an order in which the users are added to the participant slots of the lead session.

10. A system for managing social groups across activities, the system comprising:
    a communication interface that receives information from a plurality of user devices associated with a plurality of users;
    memory that stores information regarding a social group associated with the plurality of users; and
    one or more processors that executes instructions stored in memory, wherein execution of the instructions by the processors:
        establishes a lead session between a first set of the user devices associated with an invited set of the users from the social group, wherein network interactions within the lead session are based on an activity template associated with a selected activity, the activity template specifying a number of participant slots and a number of spectator slots, and
        adds the first set of the user devices associated with the invited users to the participant slots of the lead session, wherein a different set of the users from the social group are allowed to be added to the spectator slots, and wherein the established lead session is updated to include a second set of the user devices associated with the different set of the users;
    wherein the memory maintains the lead session for the social group when a different activity is selected, wherein maintaining the lead session for the social group includes maintaining information regarding the network interactions among the user devices included in the lead session in relation to the selected activity and the different activity.

11. The system of claim 10, wherein the processors execute further instructions to assign one of the users of the user devices included in the lead session as a leader of the lead session, wherein the leader is allowed to exercise leader tasks including at least designating the invited users to add the participant slots, and wherein the processors add the invited users to the participant slots based on the leader designation.

12. The system of claim 10, wherein the number of participant slots is based on a minimum number of participants specified by the activity template associated with the selected activity.

13. The system of claim 10, wherein the different activity is associated with a different activity template and the number of participant slots associated with the lead session is modified based on a different minimum number of participants specified by the different activity template.

14. The system of claim 10, wherein the memory further stores session history in memory, wherein the stored session history includes information regarding one or more past activities associated with the lead session of the social group.

15. The system of claim 14, wherein the stored session history further includes data regarding each of the users participating in each of the past activities.

16. The system of claim 10, wherein the lead session is associated with a specified number of the spectator slots.

17. The system of claim 10, wherein the processors establish the lead session by providing a chat functionality for use among the users of the user devices added to the participant slots of the lead session.

18. A non-transitory computer-readable medium having embodied thereon a program executable by one or more processors to perform a method for managing social groups across activities, the method comprising:
    storing information in memory regarding a social group associated with a plurality of users;
    establishing a lead session between a first set of user devices associated with an invited set of the users from the social group, wherein network interactions within the lead session are based on an activity template associated with a selected activity, the activity template specifying a number of participant slots and a number of spectator slots;
    adding the first set of the user devices associated with the invited users to the participant slots of the lead session, wherein a different set of the users from the social group are allowed to be added to the spectator slots, and wherein the established lead session is updated to include a second set of user devices associated with the different set of the users; and
    maintaining the lead session for the social group when a different activity is selected, wherein maintaining the lead session for the social group includes maintaining information regarding the network interactions among the user devices included in the lead session in relation to the selected activity and the different activity.

* * * * *